Figure 1:
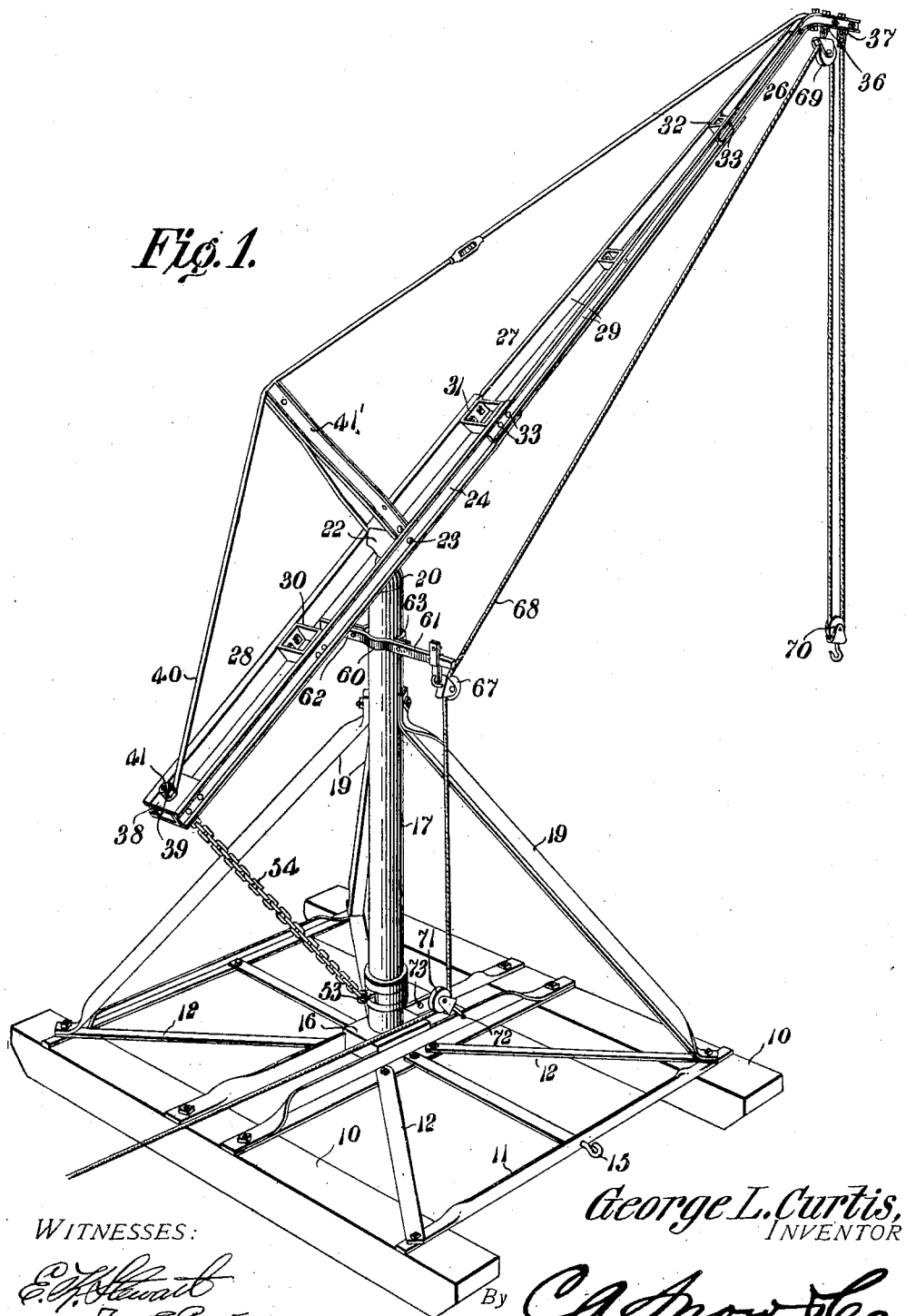

No. 888,003.  
PATENTED MAY 19, 1908.  
G. L. CURTIS.  
HAY STACKER.  
APPLICATION FILED OCT. 10, 1906.

2 SHEETS—SHEET 1.

WITNESSES:

George L. Curtis,
INVENTOR

By C. A. Snow & Co.
ATTORNEYS

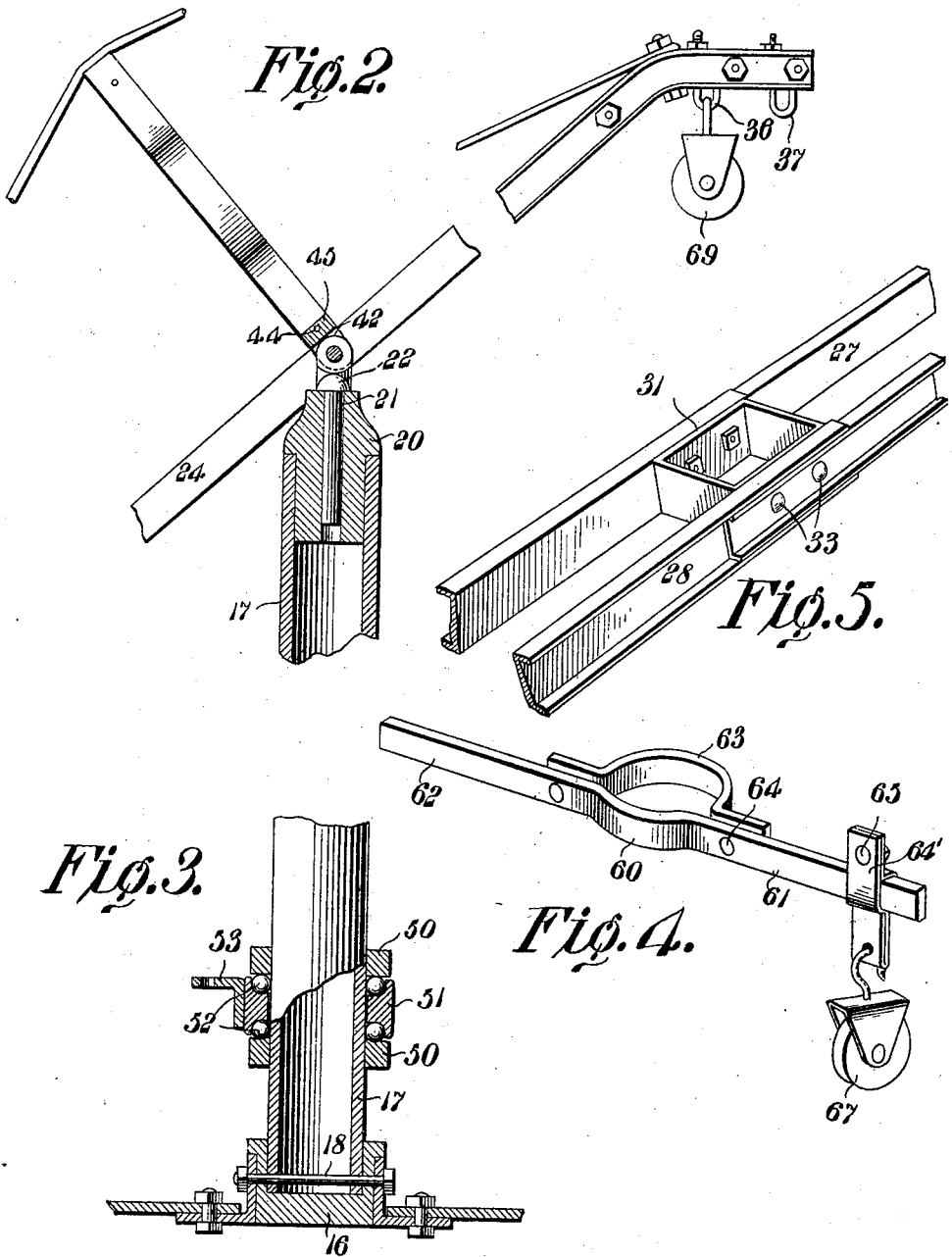

UNITED STATES PATENT OFFICE.

GEORGE L. CURTIS, OF CHICAGO, ILLINOIS.

HAY-STACKER.

No. 888,003.     Specification of Letters Patent.     Patented May 19, 1908.

Application filed October 10, 1906. Serial No. 338,284.

*To all whom it may concern:*

Be it known that I, GEORGE L. CURTIS, a citizen of the United States, residing at Chicago, in the county of Cook and State of Illinois, have invented a new and useful Hay-Stacker, of which the following is a specification.

This invention relates to hay stackers, and has for its principal object to provide a construction by which the capacity of the stacker may be greatly increased, and which may be adjusted in order to take hay or other material from any point, either in advance of the stack or to one side thereof, and deliver it to the stack.

A further object of the invention is to provide a stacker having a boom which may be readily adjusted to any desired angle in accordance with the height of the stack.

A still further object of the invention is to provide means for holding the boom in the adjusted angular position and preventing rise and fall of the boom as the latter swings around between the receiving and discharging points.

A still further object of the invention is to provide a cable lead support which may be adjusted both circumferentially and vertically of the mast in accordance with the position and swing of the boom.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a hay stacker constructed in accordance with the invention. Fig. 2 is a sectional elevation of the upper portion of the mast and boom. Fig. 3 is a similar view of the lower portion of the mast. Fig. 4 is a detail perspective view of the adjustable supporting arm for the cable lead. Fig. 5 is a perspective view of the adjustable fair leader support.

Similar numerals of reference are employed to indicate corresponding parts throughout the several figures of the drawings.

In piling hay in the form of a stack, it is usual to place the stacker alongside of and parallel with the line in which the stack is being built, and to drive the wagons to unloading position directly in the path of the stack, so that any droppings of alfalfa leaves, hay or the like may remain on the ground and be covered by the advancing stack. This usually requires a comparatively short boom swing, an arc of ninety degrees being usually sufficient. When restacking or piling a new crop on an old stack, the wagons cannot move to discharging position in advance of the stack, but must be arranged alongside thereof. This requires a much longer boom swing, and it has been found a matter of difficulty to construct a hay stacker which would effectually perform both classes of work. In carrying out the present invention, however, provision is made for so adjusting the parts as to permit of either a short or long boom swing, so that the alfalfa, hay or other material may be received and delivered at widely separated points, or at points close to each other, as circumstances may require.

The frame of the device includes a suitable platform having sills 10, the ends of which are inclined or rounded, so that the stacker may be readily drawn along the ground. These sills are united by suitable cross pieces 11 which are connected by diagonals 12, and at each end is a hook 15 to which the draft animals may be attached for the purpose of moving the stacker along the ground.

Secured to the central portion of the frame is a recessed block 16, in which is stepped the lower end of a mast 17, the latter being preferably formed of a section of cylindrical tubing, and being firmly held in the recessed block by a transverse bolt 18, or other suitable securing devices. The mast is braced by inclined struts 19, three of which are shown in the present instance, two of these struts being arranged diametrically opposite each other with respect to the mast, leaving a clear space to permit the swinging of the boom and the boom connections.

Seated in the top of the mast is a block 20 having a central opening for the reception of a vertically disposed pivot pin 21, to the upper end of which is secured an enlarged head or bracket 22, the lower surface of which rests on top of the block 20.

Extending through the enlarged head or bracket 22 is a bolt 23, on which is pivoted a boom 24, the boom being formed in sections which may be readily taken apart for convenient handling, storage, or transportation. The three sections 26, 27 and 28 of the boom are each formed of structural iron bars 29 that are connected together at a point intermediate their ends by cross braces 30, which may be of any desired shape, and at the end of the sections 27 and 28 are additional braces 31 and 32. The lower rear ends of the channel bars of each section are arranged to fit within the upper or outer ends of the next adjacent section, and the bolts 33 which extend through the connecting braces 31 and 32 also serve to unite the sections of the boom to each other. The sections are comparatively light, so that they may be readily handled, and the bars of which they are formed gradually decrease in width from the lower to the upper end of the boom. Towards the upper end of the boom the channel bars converge and are secured together by suitable bolts, while the upper end of the boom is turned out at an angle to the length thereof, forming an approximately horizontal arm to which are connected two pair of clips or U-shaped bolts 36 and 37. The rear or lower end of the boom is provided with a block 38 which serves to connect the lower ends of the channel bars, and this block also carries an eye bolt 39, the upper portion of which is embraced by an eye formed at the end of a truss rod 40, the latter being held in place by a nut 41 which is screwed on the threaded end of the eye bolt.

The truss rod 40 is secured to the upper or front end of the boom and rests on a strut or brace 41' which preferably is formed of a pair of light channel bars gradually converging toward their upper ends and provided with a seat for the truss rod. The lower ends of these channel bars are provided with rounded recesses or sockets 42 which seat against the curved top of the pivot head 22, and the lower ends of the channel bars which form this strut are connected by a bolt 44 which passes also through a spacer block 45. The construction of this portion of the mechanism is such that the weight of the strut 41 and the strain of the truss rod is imposed directly upon the pivot head and not upon the boom, so that the latter may be made comparatively light.

In devices of this general class, an arm, link or other connection is usually made between the lower end of the boom and the heel of the mast, or some portion of the structure adjacent to the heel of the mast, but these connections as a rule are of such nature that as the boom swings between receiving and discharging positions, the outer end of the boom will be compelled to move up and down, and when it moves upward the strain, being against the load, will be very severe. The structures are, furthermore, disadvantageous in that the boom will always seek the central position and will not remain in any position to which it is adjusted. In the present instance the lower portion of the mast is provided with a pair of rings 50, the opposing faces of which are arranged to form ball races, and between these rings is a second ring 51 that is provided with a pair of oppositely directed flanges also forming ball-races, two sets of anti-friction balls 52 being placed within the rings, so that the ring 51 may be free to revolve around the mast. Extending from the ring 51 is a bracket or arm 53 for connection with the lower end of a chain 54, and this chain is passed through the eye bolt 39 the chain being preferably made adjustable as to length. As the boom swings between the loading and discharging positions, the ring 51 will turn to follow the movement of the boom, and the head of the boom will, therefore, remain approximately in the same horizontal plane, and will also remain in any position to which it may be adjusted, and being readily swung around without the necessity of raising the load, the strain of the horses or other animals is less severe, and the boom may be readily drawn back to loading position by the light trip rope of the fork or carrier.

On the upper portion of the mast is secured a bar 60 the central portion of which is slightly curved to follow a portion of the circumference of the mast, and this bar has two outwardly extending arms 61 and 62. The bar is held to the mast by a clip 63 and suitable securing bolts 64, and by loosening the bolts, the bar may be adjusted circumferentially of the mast, and may, also, be moved vertically thereon and firmly locked in any position to which it is adjusted. The bar is arranged to carry a clip 64' that is held in place by a bolt 65, and by loosening the bolt, the clip may be moved toward or from the mast in accordance with the arc from which the boom is to swing, or it may be adjusted from one arm to the other in order to work from either side. This clip carries the fair leader or guiding sheave 67 through which passes a hoisting cable 63, the latter running over a sheave 69 that is hung from the clip or bolt 36, and thence passes around a running sheave 70 that supports the forks or carrier, the end of the cable being then secured to the second bolt 37. The draft end of the rope after passing through the sheave 67 passes under a sheave 71, the frame of which carries a hook 72 which may be placed in the opening 73 in the central cross bars of the platform frame, the hook being placed at the same side of the mast as the other guiding sheave 67.

In operation the boom is swung around to the load receiving position by means of the trip rope of the forks or carrier, and then after the load is received the draft animals are started up, and as the load is raised the stress on the cable 68 being to one side of the boom will tend to swing the boom around to discharging position over the stack and during this movement the ring 51 is free to follow in order that there may be no rise and fall of the boom during its swinging movement. After the load has been dumped, the boom is again hauled around to receiving position by the trip cord.

By adjusting the bar 60 circumferentially of the mast, the extent of swinging movement may be increased or diminished in accordance with the distance between the load receiving and dumping points, and inasmuch as the braces 19 are at an angle of one hundred and eighty degrees to each other, the boom may travel freely through a half circle, and thus deliver a load to a stack already formed, depositing a new crop on top of a stacked crop. When the swing of the boom is to be in the opposite direction, it is an easy matter to change the sheave carrying clip 64 to the opposite arm and shift the position of the sheave 71, correspondingly.

I claim:—

1. The combination with a sill frame, of a mast supported thereby, diagonal braces extending from the frame to the mast, two of said braces being arranged diametrically opposite each other to afford a clear approximately semi-circular working space, a pivotally mounted boom supported by the mast and arranged to swing both vertically and horizontally, a freely revoluble ring carried by the lower portion of the mast, a connecting member between the lower end of the boom and said ring, and guiding sheaves or fair leaders carried one by the mast and the other by the frame and adjustable to correspond to the direction and extent of swinging movement of the boom.

2. The combination with a mast, of a vertically and horizontally swinging boom supported thereby, a hoisting cable guiding sheave at the upper end of the boom, a second guiding sheave, and a mast-carried support for the second sheave, said support being adjustable both vertically and circumferentially of the mast to permit the sheave to act as a stop for arresting the swinging movement of the boom.

3. The combination with a mast, of a vertically and horizontally swinging boom supported thereby, a hoisting cable guiding sheave at the upper portion of the boom, a second sheave, an arm supporting the same, and means for rigidly clamping said arm to the mast, the arm and clamp being adjustable to vary the angular position of said arm in accordance with the extent of arcuate movement of the boom and to permit the second sheave to act as a stop for arresting the movement of the boom.

4. The combination with a mast, of a swinging boom supported thereby, a bar carried by the mast and including a pair of oppositely directed arms, a clamp for securing the bar to the mast, the clamp and bar being adjustable both circumferentially and vertically, an adjustable clip carried by said arm, and a sheave supported by the clip.

5. The combination with a mast, of a head block pivotally supported at the upper portion thereof, a boom pivoted to the head block and comprising a series of sections each formed of a pair of structural iron bars, open rectangular braces arranged between said bars, and bolts extending through the outer walls of said braces and the overlapping ends of the bars, the bars of the sections successively diminishing in size from the lower to the upper end of the boom.

In testimony that I claim the foregoing as my own, I have hereto affixed my signature in the presence of two witnesses.

GEORGE L. CURTIS.

Witnesses:
JNO. E. PARKER,
E. HUME TALBERT.